(12) United States Patent
Iwano

(10) Patent No.: US 6,276,837 B1
(45) Date of Patent: Aug. 21, 2001

(54) PROPELLER SHAFT SUPPORTING STRUCTURE

(75) Inventor: Kazuhiro Iwano, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/457,031

(22) Filed: Dec. 8, 1999

(30) Foreign Application Priority Data

Dec. 10, 1998 (JP) .................................................. 10-351895

(51) Int. Cl.⁷ .................................................. F16C 27/06
(52) U.S. Cl. .................................................. 384/536; 384/488
(58) Field of Search .................................................. 384/477, 478, 384/488, 535, 536, 582

(56) References Cited

U.S. PATENT DOCUMENTS

| | | | |
|---|---|---|---|
| 2,906,572 | * 9/1959 | Wroby | 384/536 |
| 4,364,613 | * 12/1982 | Mangiavacchi | 384/536 |
| 4,392,694 | * 7/1983 | Reynolds | 384/536 |
| 4,722,618 | * 2/1988 | Matsumoto et al. | 384/536 |
| 4,960,334 | * 10/1990 | Mazziotti | 384/486 |
| 5,161,903 | * 11/1992 | March | 384/536 |
| 5,551,783 | * 9/1996 | Whitney et al. | 384/536 |

FOREIGN PATENT DOCUMENTS

| | | |
|---|---|---|
| 8216709 | 8/1996 | (JP) . |
| 882317 | 3/1999 | (JP) . |

* cited by examiner

Primary Examiner—Thomas R. Hannon
(74) Attorney, Agent, or Firm—Orum & Roth

(57) ABSTRACT

The invention provides a propeller shaft supporting structure where an annular supporting member obtained by connecting an inner ring and an outer ring to each other via an elastic member axially supports a propeller shaft through a center bearing at an inner side of the inner ring. In the propeller shaft supporting structure, a metal stopper piece formed in a simple cylindrical shape with no flange is press-fitted on the propeller shaft to abut on an inner race of the center bearing so as to position and fix the center bearing to an axially predetermined position. A thin annular metal plate is fixed to an inner peripheral portion of an annular rubber flange, and the annular metal plate is fitted on an outer periphery of an end portion of the stopper piece, thereby covering the opening of the inner ring with the flange.

2 Claims, 4 Drawing Sheets

PROPELLER SHAFT SUPPORTING STRUCTURE

BACKGROUND OF THE INVENTION

1. Field of the Invention

The preset invention relates to a structure for axially supporting a propeller shaft of an automotive vehicle by a center bearing.

2. Description of the Related Art

Generally, a propeller shaft is any supported by an annular supporting member by connecting an inner ring to an outer ring via an elastic member, through a center bearing. The center bearing is supported at its outer race by the inner ring of the annular supporting member. However, when front and rear openings of the inner ring are opened, dirty water, salt water, foreign matter or the like enters into the center bearing, thereby interfering with the bearing function, which may cause seizure or noises.

In one example, a flange is integrally formed with a stopper piece press-fitted on the propeller shaft to position and fix the center bearing at a predetermined axial position, and the opening of the inner ring is covered with the flange.

This example is shown in FIG. 4 In FIG. 4, a propeller shaft 01 is axially supported through a center bearing 05 by an annular supporting member 010 obtained by connecting an inner ring 011 to an outer ring 012 via an elastic member 013. The center bearing 05 is fitted on the propeller shaft 01 at a predetermined position inside the inner ring 011. One end of an inner race thereof abuts on a step portion of the propeller shaft 01, and the other end thereof is pressed by a stopper piece 06 made of a steel member press-fitted on the propeller shaft 01, so that the center bearing 05 is positioned in an axial direction and fixed.

As mentioned above, the inner ring 011 of the annular supporting member 010 supporting the center bearing 05 therewithin has openings in front and rear portions. A rear opening is covered with an expanded large diameter portion of the propeller shaft 01 and a front opening is covered with a flange 06a integrally formed on the stopper piece 06, thereby preventing dirt water or the like from entering into the interior of the center bearing 05 as much as possible. In the interior of the inner ring 011, the front and rear portions of the center bearing 05 are sealed by seal members 07 and 08. Dirty water is prevented from entering as much as possible by covering the front and rear openings of the inner ring 011 as described above, thereby increasing the sealing effect.

Since dirty water or salt water tends to splash on the flange 06a of the stopper piece 06 part ay covering the front opening in the inner ring 011, the flange 06a is subject to severe corrosion. In the worst case, there is the possibility that the flange 06a may fail due to the corrosion. When the flange 06a is damaged, water or the like directly enters into the inner ring 011, and the seal member 07 can not sufficiently seal and water enters into the center bearing 05 to damage the center bearing 05, presenting the possibility that bearing function may be deteriorated, or seizure or noises may occur.

Further, since the stopper piece has the flange and has a varying outer diameter configuration, a cutting process therefor cannot easily be performed, and manufacturing cost is increased because painting is required for preventing corrosion.

Still further, since the stopper piece has the flange and a thickness thereof varies in an axial direction, it is difficult to determine the force for pressing into the propeller shaft, and high accuracy is required.

SUMMARY OF THE INVENTION

The present invention has been developed in view of the above facts. An object of the present invention is to provide a propeller shaft supporting structure in which a flange covering an opening of an inner ring in an annular supporting member supporting a center bearing therewithin is constituted with rubber, so that the flange is prevented from being corroded by salt water or the like so as to maintain a high sealing effect, and a stopper piece can be easily produced at a low cost.

In order to achieve the object mentioned above, in accordance with the present invention, there is provided a propeller shaft supporting structure where an annular supporting member obtained by connecting an inner ring and an outer ring to each other via an elastic member axially supports a propeller shaft through a center bearing at an inner side of the inner ring. A stopper piece made of metal and formed in a simple cylindrical shape with no flange is press-fitted on the propeller shaft to abut on an inner race of the center bearing, thereby positioning and fixing the center bearing to an axially predetermined position. A thin annular metal plate is fixed to an inner peripheral portion of an annular rubber flange, and the annular metal plate is fitted on an outer periphery of an end portion of the stopper piece, thereby covering the opening of the inner ring with the flange.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

An embodiment in accordance with the present invention will be described below with reference to FIGS. 1 to 3.

Figure 1:
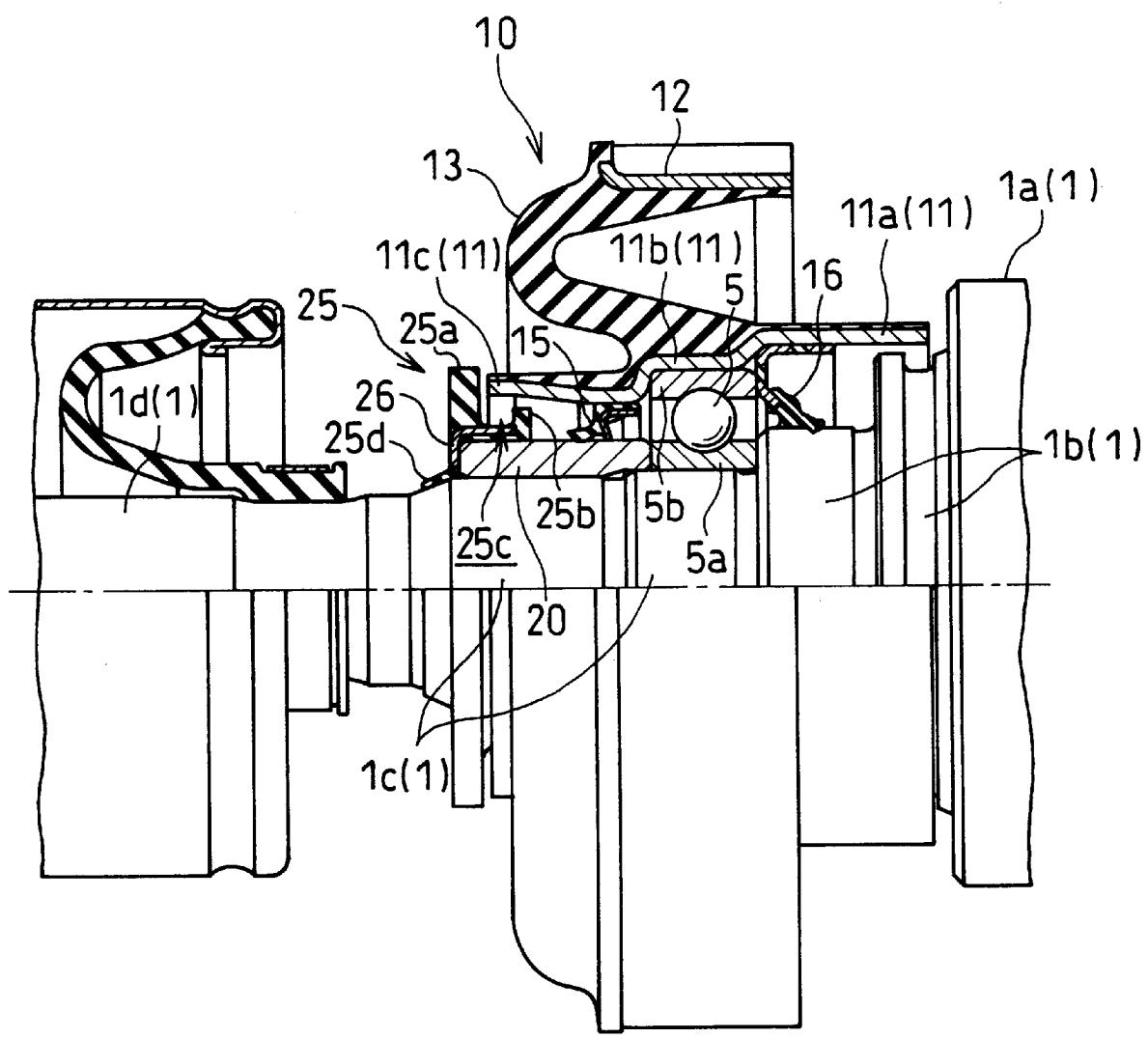
FIG. 1 is a partially sectioned side view showing a propeller shaft supporting structure in accordance with an embodiment of the present invention.
Figure 2:
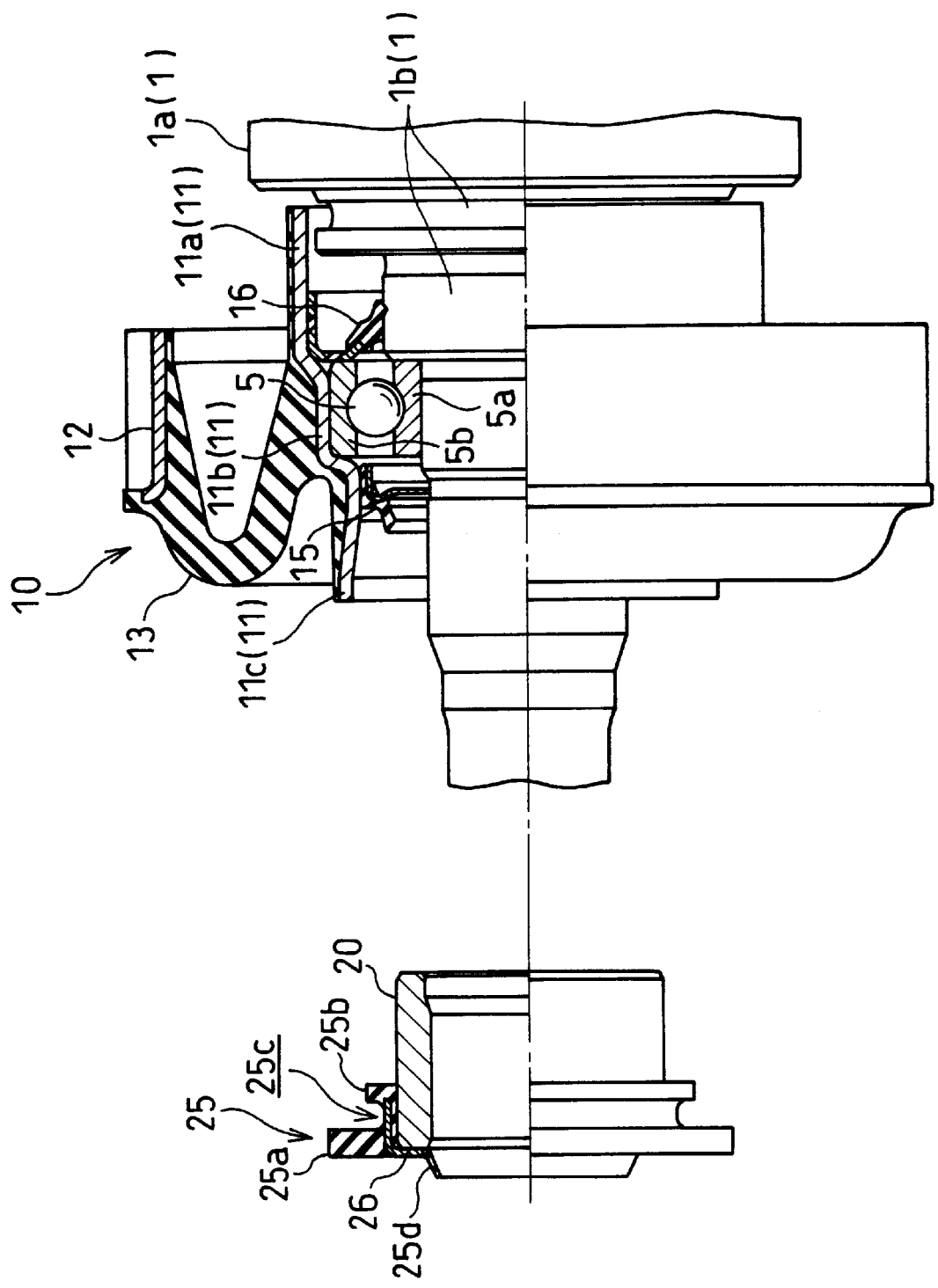
FIG. 2 is a side view showing a stage immediately before assembling a stopper piece.

FIG. 1 is a partially sectioned side view which shows a propeller shaft supporting structure of the present embodiment, and FIG. 2 is a side view showing a stage immediately before completing assembly.

A propeller shaft 1 is structured such that a diameter thereof is changed from a large-diameter portion 1a to a joint portion 1d at a front end (a left end in FIG. 1) in a stepping manner so as to form a middle-diameter portion 1b and a small-diameter portion 1c, and is axially and rotatably supported to an annular supporting member 10 via a center bearing 5 at the middle-diameter portion 1b and the small-diameter portion 1c.

The center bearing 5, a radial ball bearing, is fitted on the small-diameter portion 1c of the propeller shaft 1 and is caused to abut on a side surface of the middle-diameter portion 1b at an inner race 5a so as to be properly positioned.

The annular supporting member 10 is structured by connecting an inner ring 11 and an outer ring 12 to each other via a rubber elastic member 13. The inner ring 11 forms a cylindrical shape having a large diameter portion 11a, a middle-diameter portion 11b and a small-diameter portion 11c whose diameters vary in a step pattern. An outer race 5b of the center bearing 5 is fitted on an inner side of the middle-diameter portion 11b. The large-diameter portion 11a extends rearward so as to cover an outer periphery of the middle-diameter portion 1b in the propeller shaft 1, and the small-diameter portion 11c extends forward so as to cover an outer periphery of the small-diameter portion 1c in the propeller shaft 1.

In the manner mentioned above, the propeller shaft 1 is axially and rotatably supported via the center bearing 5 supported to the inner ring 11 of the annular supporting member 10 so as to freely rotate, and seal members 15 and 16 are inserted to both front and rear sides of the center bearing 5. In this stage, a stopper piece 20 is press-fitted on the propeller shaft 1, and FIG. 2 shows a stage immediately before the press-fitting.

Figure 3:
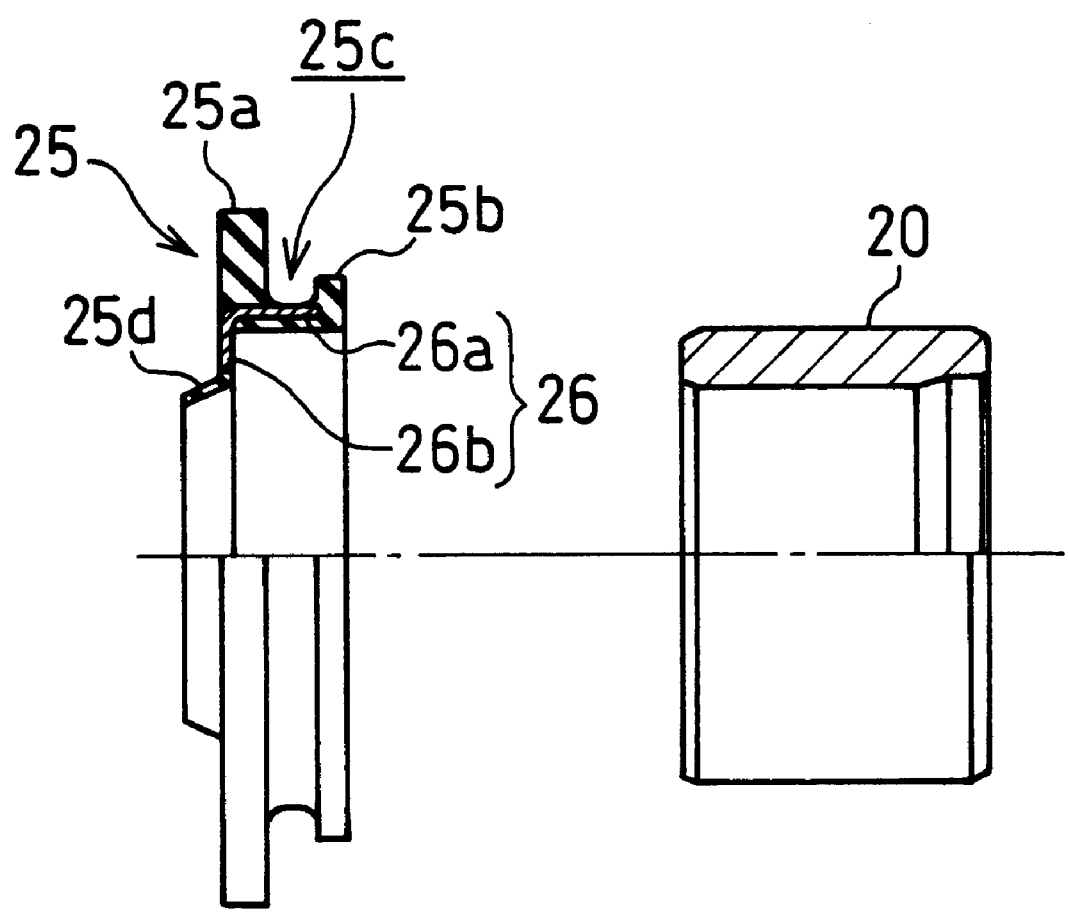
FIG. 3 is a partly sectioned and exploded side view of the stopper piece and a flange.
Figure 4:
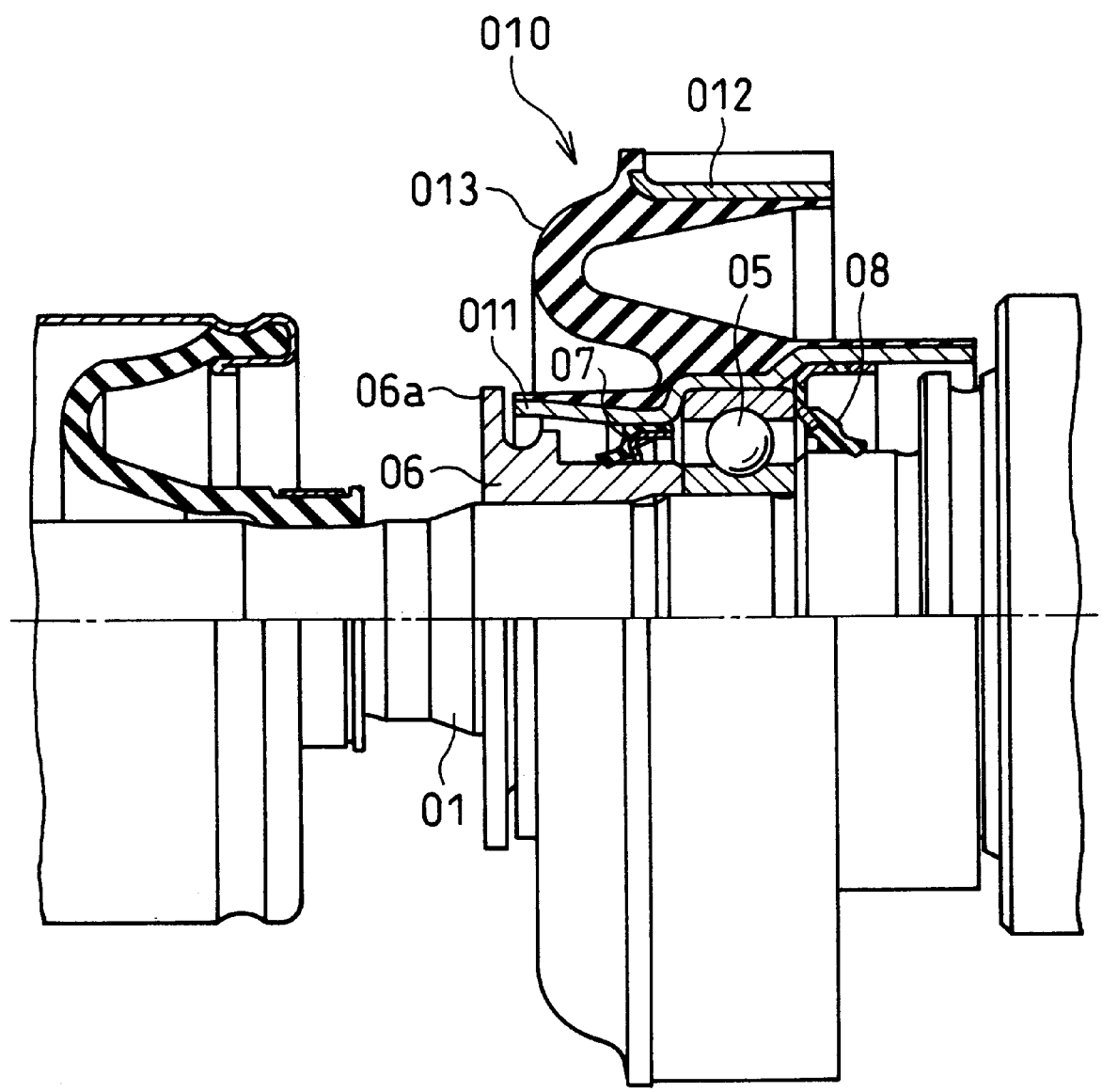
FIG. 4 is a partly sectioned side view showing a conventional propeller shaft supporting structure.

A flange 25 is integrally fitted on the stopper piece 20, and FIG. 3 shows an exploded view thereof.

The stopper piece 20 is made of step and is formed in a substantially simple cylinder shape. An inner diameter thereof is substantially equal to an outer diameter of the small diameter portion 1c of the propeller shaft 1.

Meanwhile, the flange 25 is made of rubber and is formed in a cylindrical shape, and a thin annular metal plate 26 is fixed to an inner peripheral portion thereof. The annular metal plate 26 is formed in an L-shaped cross sectional shape with a peripheral wall 26a and an annular side wall 26b, and the rubber flange 25 is baked so as to cover all the surface of the annular metal plate 26.

The rubber flange 25 is formed with a large-diameter ring portion 25a at a it thereof and a small-diameter ring portion 25b at the rear thereof with a thin groove portion 25c baked on an outer periphery of the peripheral wall 26a and positioned therebetween. An outer diameter of the large-diameter ring portion 25a is larger than the small-diameter portion 11c of the inner ring 11 in the annular supporting member 10, but, an outer diameter of the small diameter ring portion 25b is smaller than the small-diameter portion 11c. In this case, an annular projecting 25d protrudes forward from the inner peripheral edge of the annular side wall 26b in a tapered manner.

The rubber is thinly formed on an inner surface of the peripheral wall 26a in the annular metal plate 26, and an inner diameter thereof is smaller than an outer diameter of the stopper piece 20, so that both elements are fitted in an attitude shown in FIG. 3. The flange 25 is press-fitted on an outer peripheral surface of the front end portion in the stopper piece 20, and they are integrally fitted on each other as shown in FIG. 2.

As mentioned above, in a sub-assembly state in which the flange 25 is fitted on the stopper piece 20 via the annular metal plate 26, the stopper piece 20 is press-fitted on the small-diameter portion 1c of the propeller shaft 1. The rear end of the stopper piece 20 extends through an inner side of the seal member 15 and is brought into contact with a front end surface of the inner race 5a in the center bearing 5 so as to position and fix the center bearing 5.

At this time, the small-diameter ring portion 25b of the flange 25 is inserted into the small-diameter portion 11c of the inner ring 11 in the annular supporting member 10. The large-diameter ring portion 25a comes dose to the front end opening of the inner ring 11 as shown in FIG. 1, thereby covering the opening.

In the case that dirty water or salt water splashes on the bearing structure portion in the propeller shaft 1, particularly from the front, the front end opening of the inner ring 11 in the annular supporting member 10 is covered with the large-diameter ring portion 25a of the flange 25 and can prevent the water from directly entering into the inner ring 11 having the center bearing 5 therewithin. Also, even when the water enters from a gap between the large-diameter ring portion 25a and the inner ring 11, the water is guided to the groove portion 25c between the large-diameter ring portion 25a and the small-diameter ring portion 25b in the flange 25 and drops downward, so that water is prevented from entering into the inner ring 11.

In this case, the rear end opening of the inner ring 11 is covered with the large-diameter portion 1a of the propeller shaft 1, and a groove portion is formed in the middle diameter portion 1b contacting with the large-diameter portion 1a, so that water is prevented from entering in the same manner as mentioned above.

The center bearing 5 within the inner ring 11 is sealed by the seal members 15 and 16 at the front and rear portions, and additionally water is prevented from entering at the front and rear opening portions in the inner ring 11, so that the center bearings can be securely protected from dirty water, salt water or the like.

Further, since the flange 25 fitted on the end portion of the stopper piece 20 via the annular metal plate 26 is made of rubber, the opening of the inner ring 11 in the annular supporting member 10 supporting the center bearing 5 inside is covered with the non-corrosive rubber flange 25. The inner ring 11 is prevented from being corroded with salt water or the like, so that the rubber flange 25 can cover the opening of the inner ring 11 for a long time and can maintain an effective seal.

Further, since the stopper piece 20 itself has no flange and is formed in a simple cylindrical shape, it can be simply cut, the use of an anticorrosive paint can be avoided, and manufacturing cost can be maintained at a low level.

In this case, since the end surface of the stopper piece 20 is covered with the annular side wall 26b of the annular metal plate 26 so as not to be exposed to the outside, and the tapered annular projection 25d of the rubber flange 25 is caused to forcibly contact the propeller shaft 1 so as to shut the stopper piece 20 from the outside, there is no problem of corrosion. Since the entire surface of the annular metal plate 26 is also covered with the rubber of the rubber flange 25, there is no problem of corrosion.

Since the stopper piece 20 is formed in a simple cylindrical shape and the thickness thereof is relatively consistent in an axial direction, the required force for press-fitting an the propeller shaft 1 can be easily determined, and high accuracy is not required, so that manufacturing cost can be maintained at a low level.

Since the stopper piece 20 is press-fitted on the small-diameter portion 1c of the propeller shaft 1 in a assembly state such that the flange 25 is fitted on the outer periphery of the end portion in the stopper piece 20 by the thin annular metal plate 26, efficient assembling is facilitated and productivity is not hampered.

While the preferred embodiments of the invention have been described in detail with reference to the drawings, they are by no means limitative, and various changes and modifications are possible without departing from the scope and spirit of the invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include a possible embodiments which can be embodied within a scope encompassed and equivalents thereof with resect to the features set out in the appended claims.

What is claimed is:

1. A propeller shaft supporting structure, comprising an annular supporting member having an inner ring and an outer ring connected each other via an elastic member arranged and constructed to axially support a propeller shaft through a center bearing at an inner side of said inner ring, a metallic stopper piece formed in a simple cylindrical shape with no flange is press-fitted on said propeller shaft to abut on an inner race of said center bearing so as to position and fix said center bearing to an axially predetermined position; and a thin annular metallic plate is fixed to an inner peripheral portion of an annular rubber flange, said annular metallic plate being fitted on an outer periphery of an end portion of said stopper piece, thereby covering an opening of said inner ring with said flange.

2. A propeller shaft supporting structure according to claim 1, wherein said stopper piece is press-fitted on said propeller shaft so as to position and fix said center bearing such that said flange fixed at an inner periphery thereof with said annular metallic plate is integrally fitted on the outer periphery of the end portion in said stopper piece.

* * * * *